(12) United States Patent
Strong et al.

(10) Patent No.: US 10,919,562 B2
(45) Date of Patent: Feb. 16, 2021

(54) STEERING ASSEMBLY WITH POSITIVE LOCK AND ENERGY ABSORPTION AND PYROTECHNIC ACTUATOR

(71) Applicant: NSK LTD., Tokyo (JP)

(72) Inventors: Scott Lewis Strong, Manchester, MI (US); David Ray Hartman, Brighton, MI (US); Victor Corona Martinez, Ann Arbor, MI (US)

(73) Assignee: NSK LTD., Tokyo (JP)

(*) Notice: Subject to any disclaimer, the term of this patent is extended or adjusted under 35 U.S.C. 154(b) by 86 days.

(21) Appl. No.: 16/337,097

(22) PCT Filed: Sep. 27, 2017

(86) PCT No.: PCT/US2017/053711
§ 371 (c)(1),
(2) Date: Mar. 27, 2019

(87) PCT Pub. No.: WO2018/064161
PCT Pub. Date: Apr. 5, 2018

(65) Prior Publication Data
US 2020/0031382 A1 Jan. 30, 2020

Related U.S. Application Data

(60) Provisional application No. 62/400,257, filed on Sep. 27, 2016, provisional application No. 62/400,249, filed on Sep. 27, 2016.

(51) Int. Cl.
*B62D 1/19* (2006.01)
*B62D 1/184* (2006.01)
*B62D 1/187* (2006.01)

(52) U.S. Cl.
CPC ............. *B62D 1/195* (2013.01); *B62D 1/184* (2013.01); *B62D 1/192* (2013.01); *B62D 1/187* (2013.01)

(58) Field of Classification Search
CPC .......... B62D 1/18; B62D 1/184; B62D 1/185; B62D 1/187; B62D 1/189; B62D 1/19; B62D 1/192; B62D 1/195
See application file for complete search history.

(56) References Cited

U.S. PATENT DOCUMENTS

| | | |
|---|---|---|
| 4,901,592 A | 2/1990 | Ito et al. |
| 5,820,163 A | 10/1998 | Thacker et al. |

(Continued)

FOREIGN PATENT DOCUMENTS

| | | |
|---|---|---|
| DE | 10201003894 A1 | 12/2011 |
| EP | 0818379 A2 | 1/1998 |

OTHER PUBLICATIONS

International Search Report and Written Opinion for International Application No. PCT/US2017/053711; dated Dec. 12, 2017.

*Primary Examiner* — Laura Freedman
(74) *Attorney, Agent, or Firm* — The Dobrusin Law Firm, P.C.

(57) ABSTRACT

An energy absorption plate (52) for a steering column assembly (10) having a first end (54) and a second end (56), an arcuate segment (62), a first generally flat segment (58) between the first end (54) and the arcuate segment (62), and a second generally flat segment (64) between the second end (56) and the arcuate segment (62). The first generally flat segment (58) is situated generally parallel to the second generally flat segment (64). The first generally flat segment (58) is configured to face away from a column tube (18) of a steering column assembly (10). The second generally flat segment (64) is adapted to be secured to the column tube (18) of the steering column assembly (10). The first generally flat segment (58) includes one or more features, such as a toothed portion (66), for engaging with a fastener, such as a spring-biased fastener (44), to lock the column tube (18)

(Continued)

in proper position. A steering column assembly (10) including this energy absorption plate (52) is also contemplated.

20 Claims, 6 Drawing Sheets

(56) References Cited

U.S. PATENT DOCUMENTS

| | | | |
|---|---|---|---|
| 6,487,807 B1 | 12/2002 | Kopman et al. | |
| 8,047,096 B2 | 11/2011 | Ridgway et al. | |
| 8,438,944 B2 * | 5/2013 | Ridgway | B62D 1/195 |
| | | | 74/493 |
| 8,689,659 B2 * | 4/2014 | Schnitzer | B62D 1/195 |
| | | | 74/492 |
| 8,894,097 B2 * | 11/2014 | Sulser | B62D 1/184 |
| | | | 280/777 |
| 9,233,707 B2 * | 1/2016 | Domig | B62D 1/195 |
| 9,399,481 B2 * | 7/2016 | Oehri | B62D 1/195 |
| 9,428,213 B2 | 8/2016 | Tinnin | |
| 9,669,862 B1 * | 6/2017 | Dubay | B62D 1/195 |
| 9,828,019 B2 * | 11/2017 | Dubay | B62D 1/195 |
| 9,834,246 B1 * | 12/2017 | Woycik | B62D 1/192 |
| 9,994,247 B2 * | 6/2018 | Dubay | B62D 1/195 |
| 10,099,715 B2 * | 10/2018 | Bodtker | B62D 1/192 |
| 10,703,403 B2 * | 7/2020 | Reno | B62D 1/184 |
| 2007/0194563 A1 | 8/2007 | Menjak et al. | |
| 2008/0111383 A1 | 5/2008 | Van Ravenhorst | |
| 2008/0236325 A1 | 10/2008 | Ridgway et al. | |
| 2009/0174177 A1 | 7/2009 | Gerzseny et al. | |
| 2010/0032933 A1 | 2/2010 | Cymbal et al. | |
| 2010/0300238 A1 | 12/2010 | Ridgway et al. | |
| 2013/0074641 A1 | 3/2013 | Schnitzer et al. | |
| 2013/0233117 A1 | 9/2013 | Read et al. | |
| 2015/0096404 A1 | 4/2015 | Martinez et al. | |
| 2015/0128752 A1 | 5/2015 | Buzzard et al. | |
| 2016/0159387 A1 * | 6/2016 | Okano | B62D 1/184 |
| | | | 74/493 |

* cited by examiner

Fig-9

# STEERING ASSEMBLY WITH POSITIVE LOCK AND ENERGY ABSORPTION AND PYROTECHNIC ACTUATOR

FIELD

In general, the present teachings relate to an improved collapsible steering column assembly and methods associated with the same (e.g., methods of providing energy absorption, such as in a secondary impact). More particularly, though having aspects making it adaptable to external collapsing column systems, the present teachings are directed mainly at an internal collapsing tilt and/or telescopically adjustable steering column system.

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ('reach') function, with a lever provided for a vehicle user to manually release for affording rake and reach adjustment to a selected position, and then to re-engage for fixing the steering column in the selected position.

Notwithstanding efforts to improve collapsible steering column assemblies, (e.g., internally collapsible steering column assemblies), there remains a need for alternative assemblies, particularly those in which during an impact such as a secondary impact, one or both of a user operating device (e.g., a lever) and a steering wheel (if employed) may be translated forward and away from a vehicle user.

The following U.S. patent documents may be related to the present invention: U.S. Patent Application Publication Nos. 2008/0236325; 2008/0111363; 2009/0174177 2010/0300238; 2010/0032933; and 2015/0096404; and U.S. Pat. Nos. 8,047,096, 9,428,213, all of which are incorporated by reference herein for all purposes. Published U.S. Application No. 2013/0233117 also may have teachings related to the present invention and is incorporated by reference herein.

SUMMARY

The present teachings make use of a simple, yet elegant, construction approach by which relatively few components can be employed for achieving an energy absorbing steering column assembly, such as a collapsible steering column assembly. The steering column assembly may be an adjustable (e.g., for rake and/or reach) steering column assembly. For example, though having applicability to externally collapsing assemblies (which are contemplated within the present teachings), the steering column assembly herein may be an internally collapsible assembly. It may be an assembly that is affixed within a vehicle at one or more fixation points so that upon a secondary impact the steering column assembly resists forward motion substantially beyond (e.g., about 10 mm or more or about 20 mm or more beyond) the one or more fixation points. It may be a collapsible steering column assembly that exhibits relatively good energy absorption characteristics, especially during a secondary impact. It may be a collapsible steering column assembly that exhibits longitudinal displacement (e.g., forward translation) of one or more components of the assembly (e.g., a column tube) during a secondary impact.

As one general way of characterizing the present teachings, there is envisioned a collapsing steering column assembly. It may be an internally collapsing assembly or an externally collapsing assembly. Though, it is particularly attractive for an internally collapsing assembly in which at least a portion of the assembly is secured against any substantial forward movement (e.g., about 50 mm or less, about 20 mm or less, or about 10 mm or less) within a vehicle. The steering column assembly may include a steering wheel position adjustment portion (e.g., an arrangement adapted for adjusting the rake and/or reach position of a steering wheel relative to a vehicle operator, such as a telescoping tubular arrangement). It may include a bracket (e.g., a tilt bracket) for at least partially carrying the steering wheel position adjustment portion and attaching the assembly within the vehicle. It may include a securing member (e.g., as discussed elsewhere herein, a tilt bolt or other elongated member, such as one that is adapted for applying a securing force to help maintain a steering column assembly in a desired position) for fixing the position of the steering wheel position adjustment portion (such as by operation of a lever that is adapted to be employed by an operator to apply or remove a securing force). During normal operation, the steering column assembly may be in a secure engagement position, where at least a portion of the steering shaft support structure (e.g., a column tube, a column housing, or both) is fixed in a fixed position in the steering column assembly. The secure engagement position may be the adjusted position selected by the user in an adjustable position steering column assembly.

It is envisioned that the assembly may include an energy absorption structure capable of deformation during an impact. For instance, the energy absorption structure may be configured in a manner such that it can allow for controlled movement of a component relative to another so that one or more components of the steering wheel adjustment portion translate forward in the event of an impact, such as a secondary impact. It is also envisioned that the at least one energy absorption device is operable to absorb energy in a collapse stroke occasioned in response to a force applied to it due to the secondary impact. For instance, forward travel of the column tube may occur as a result of the impact such as a secondary impact, which may operatively engage the at least one energy absorption device or structure (e.g., a plastically deformable elongated member such as a metal strip or bend plate).

In one general aspect of the teachings, there is contemplated a collapsing steering column assembly that includes a column tube, a steering shaft (adapted for coupling with a steering wheel or other like structure) that is supported for rotation at least in part by the column tube and having a longitudinal axis; and a suitable bracket for carrying the column tube and attaching the assembly within a vehicle (e.g., to a cross-vehicle structure). The bracket may be coupled with a column housing, such as for securing the column housing in a generally fixed position within the vehicle. The column tube may configured to be carried by the column housing (e.g., in a telescoping manner), in one or more fixed positions. For example, the column tube may be telescopically adjustable (e.g., by way of a manual adjustment lever or a motor) within and/or relative to the column housing. The column housing and the column tube each will have a longitudinal axis. Their respective longitudinal axes may be generally aligned (e.g., they may be generally co-axial). The position of the column tube relative to the column housing may be fixed by way of a securing member (e.g., a tilt bolt as will be described) that is located in a secure engagement position and applies a force (e.g., a generally transverse force relative to the longitudinal axes of the column tube and the column housing) to at least one of the column housing or column tube for causing a secure engagement of the column tube and the column housing (e.g., a clamped engagement, an interference, interlock, detent or other mechanical engagement). In the event of a secondary impact exceeding a threshold load, the column tube may be permitted to translate (e.g., forward) relative to the column housing, and may also causes an energy absorption device (e.g., a metal strip) to absorb energy from the secondary impact (e.g., by plastically deforming (with or without elongation, compaction, shear strain, and/or buckling)).

The present teachings may relate to a collapsing steering column assembly (e.g., an internally collapsing steering column assembly) for an automotive vehicle, including a column tube; a steering shaft supported for rotation at least in part by the column tube and having a longitudinal axis; and a bracket (e.g., a tilt bracket adapted for receiving or otherwise carrying and/or supporting at least a portion of the column tube and/or for mounting the steering column assembly within the automotive vehicle). A column housing may be employed for telescopically carrying the column tube (e.g., the column tube may be configured to be located within the column housing). The column housing and column tube may be part of a steering shaft support structure. The column housing may have a portion that is adapted to be pivotally mounted within a vehicle (e.g., in a fixed position, or in a position that allows slight forward travel (e.g., about 20 mm or less or about 10 mm or less) of the column housing from a load occasioned by a secondary impact). The steering column assembly may include one or more brackets or at least one portion adapted to mount the assembly to a vehicle (e.g., to a cross-vehicle structure), and a portion adapted to carry (directly or indirectly) the column tube. For example, the bracket may include an upper wall for attachment to the vehicle and an outwardly projecting wall structure that projects away from the upper wall (and which may be configured to flank the column tube and/or afford at least a partial vertical translation of the column tube relative to the upper wall). A manually operated steering wheel adjustment subassembly may also be employed. It may be adapted for (i) selectively adjusting the steering shaft in a fore or aft direction generally along the longitudinal axis, (ii) selectively raising or lowering the steering shaft; or (iii) both (i) and (ii). The steering wheel adjustment subassembly typically will include a lever adapted for manually actuating the subassembly, and at least one engagement member that is brought into and out of engagement with the column tube or a structure attached to the column tube for selectively locking the steering shaft into a position (which may be relative to the position of the column housing) desired by a user. The column housing may be pivotally mounted at a pivot mounting location within the automotive vehicle. The column housing may at least partially surround the column tube. The column housing, the tilt bracket, and/or the column tube may include one or more structures and/or mechanisms adapted for securing the column tube into position using the lever. Desirably, during a secondary impact, the column housing remains in a generally fixed position relative to the pivot mounting location (e.g., if it travels longitudinally it travels about 20 mm or less or about 10 mm or less).

By way of summary, the teachings herein contemplate an energy absorption plate for a steering column assembly. The energy absorption plate may comprise a first end and a second end and an arcuate segment. The energy absorption plate may include a first generally flat segment between the first end and the arcuate segment. The energy absorption plate may include a second generally flat segment between the second end and the arcuate segment. The first generally flat segment may be situated generally parallel to the second generally flat segment. When installed in a steering column assembly, the first generally flat segment may be oriented to face away from the column tube of the steering column assembly. The second generally flat segment may be adapted to be secured to the column tube of the steering column assembly (e.g., via a fastener, such as a rivet). The first generally flat segment may include one or more features for engaging with a fastener to lock the column tube in position in the steering column assembly. The first generally flat segment may comprise a toothed portion for engaging with a toothed fastener. The second generally flat segment may be employed for absorbing energy by way of plastic deformation of the energy absorption plate during a forward translation of the column tube during a secondary impact.

The teachings herein also contemplate a collapsing steering column assembly. The steering column assembly may include a column tube, a steering shaft that is supported for rotation at least in part by the column tube and a bracket for at least partially carrying the column tube. The collapsing steering column assembly may include the energy absorption plate as disclosed herein. The energy absorption plate may be secured to the column tube. The steering column assembly may further include a manually operated steering wheel adjustment subassembly including a lever for manually actuating the steering wheel adjustment subassembly. The column tube may be configured for telescoping insertion within the column housing. The steering wheel adjustment subassembly may be adapted for selectively adjusting the steering shaft, column tube, or both, in a fore or aft direction generally along the longitudinal axis; selectively raising or lowering the steering shaft, column tube, or both;

or both tilt adjustment and telescope adjustment. The steering wheel adjustment subassembly may include a spring-biased fastener adapted to engage with or be received within the one or more features of the first generally flat segment of the energy absorption plate to lock the column tube in position in the steering column assembly. The spring-biased fastener may include a toothed end portion that engages with a toothed portion of the first generally flat segment. The lever for manually actuating the steering wheel adjustment subassembly may include a ramp having an angled surface that is adapted to contact the spring-biased fastener to cause engagement of the fastener and the first generally flat segment of the energy absorption plate when in a locked position. The second generally flat segment may be adapted to absorb energy by way of plastic deformation of the energy absorption plate during a forward translation of a column tube during a secondary impact. The assembly may further comprise a securing member for fixing a secure engagement position of the column tube relative to the bracket. The securing member may be a tilt bolt. The bracket of the steering column assembly may include pair of generally opposing downwardly oriented tilt plates that flank either or both of at least a portion of the column tube or column housing. The tilt plates may each have a vertical slot. Each vertical slot may receive a structure including a rotational member (e.g., a toothed rotational member) for securing the column tube at a desired angle. The energy absorption plate, when employed, may absorb energy by plastic deformation during an impact as the column tube translates along the column housing. The steering column assembly may further include a second energy absorption plate wrapped around the energy absorption plate (e.g., in a nesting arrangement). Both plates may then be fixed to the column tube.

The present teachings also contemplate a steering column assembly including an actuator (e.g., a pyrotechnic actuator). The actuator may include a blocking member or pin that engages with one or more energy absorption elements to increase energy absorption. The blocking member or pin, for example, may penetrate one or both energy absorption plates. The blocking member or pin may engage with one or more surfaces of an energy absorption plate without penetrating the energy absorption plate. The blocking member or pin may be engaged with a mating surface of an energy absorption plate. For example, the end of the pin that engages with the energy absorption plate may have a concave surface, convex surface, toothed surface, angled surface, conical surface, or the like. The surface of the energy absorption plate may have a complementary shape for engaging with the end of the pin. The energy absorption strip may have one or more additional curvatures so that a free end of the energy absorption strip bears against a portion of the blocking member or pin. The actuator may be employed to selectively change between different energy absorption loads.

As can be seen, it is thus possible to realize a unique assembly (and associated methods) that enable a steering column assembly to transmit steering torque, smoothly rotate, and absorb energy during an impact such as a secondary impact d u ring a vehicle collision, while also providing adjustable driving positions.

BRIEF DESCRIPTION OF THE DRAWINGS

FIGS. 2A and 28 illustrate views of a tilt and telescope adjustment assembly in accordance with the present teachings.

FIG. 88B illustrates an enlarged, partial cutaway view of the pyrotechnic actuator of FIG. 8A.

DETAILED DESCRIPTION

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a collapsing steering column assembly. The steering column assembly may include a mounting portion for securing the steering column assembly in a vehicle in a fixed operational position. The assembly may have a collapsing portion, at least a portion of which is adapted to travel forward relative to the mounting portion, while the mounting portion stays generally in its fixed operational position (e.g., any travel of the mounting portion is controlled and limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner (e.g., at least one first structure that is operatively connected to a steering wheel (such as a column tube) may advance forward (e.g., along an axis that is generally parallel with (such as within about 10° of being parallel with) a vehicle longitudinal axis) in a vehicle relative to at least one second structure that may at least partially surround the at least one first structure (e.g., a column housing)).

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. Securing may be realized by a suitable securing member (e.g., an elongated force applying member), such as a bolt (e.g., a tilt bolt), rod, strap, bar, band, wedge, cam, or other suitable member, or a combination thereof. For instance, the securing member may be adapted, upon actuation of the user operating device to cause a cam or rotational member to rotate and engage with a wall of a tilt plate to secure the steering wheel at its desired angle. Upon actuation of the user operating device, a pin may be brought out of or pushed into engagement with an opening or toothed portion of a strip located on or attached to a column tube, allowing for telescoping adjustment.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube (e.g., each may have a longitudinal axis that is generally parallel or even coaxial with each other). One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate the assembly. An electromechanical device that applies or releases a force in response to a signal from an operation switch may be employed. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user.

The teachings address an assembly that may typically include a column tube, a steering shaft, a bracket (e.g., a tilt bracket), a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is further contemplated that a lever may be used to cause a tilt or telescoping function, while a motor or other electromechanical actuator may be used to cause the other of the tilt or telescoping function. At least one engagement member (e.g., a pin) may be brought into and out of engagement with the column tube or a structure secured thereto for selectively locking the steering shaft into a position (e.g., telescoped position) desired by a user (e.g., via the lever). One or more rotational members may be brought into and out of engagement (e.g., via interference) with a wall of a tilt plate defining a vertical slot for adjustment of the tilt position desired by a user (e.g., via the lever). A mounting structure may detachably mount the steering wheel adjustment subassembly relative to the bracket (e.g., tilt bracket). During an impact such as a secondary impact, the column housing remains in a generally fixed position relative to a forward pivot mounting location (e.g., any forward translation is limited to a relatively small amount (e.g., about 20 mm or less or about 10 mm or less)).

The assemblies as described herein generally will include a tube that is operatively connected with a steering wheel (not shown), e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar or both. As noted, the steering shaft may be supported for rotation at least in part by the column tube and have a longitudinal axis that may be generally coaxially aligned with the longitudinal axis of the column tube.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing or both). For example, a bracket may include one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. The tilt portion may be omitted. A mounting bracket may be employed separately from a structure defining a tilt portion. Examples of brackets that may be employed, in addition to the examples described herein, include those of United States Published Application No. 20100300238 (the entirety of which is incorporated by reference for all purposes; see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets) may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure that at least partially flanks at least a portion of the steering shaft support structure (e.g., the column tube). The bracket (e.g., tilt bracket) may include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or a column tube, to a vehicle. An energy absorption device may be employed to limit forward travel of one or more components of the steering column assembly, such as the column tube, steering shaft, or both.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other adapted for manually actuating the subassembly. The subassembly may include at least one engagement member (e.g., a pin) that is brought into and out of engagement with the column tube or a structure secured thereto for selectively locking the steering shaft into a position desired by a user (e.g., a fore or aft position). Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other). The subassembly may also include one or more spacers as described further herein.

A column housing is pivotally mounted at a pivot mounting location (e.g., a permanently fixed mounting) within the automotive vehicle. The pivot mounting location may be at or within about 20, about 30, about 40 or about 50 mm of a forward end of the column housing. The pivot mounting location may be on an underside of the column housing, on a top side of the column housing, or at some location in between the topside and the underside of the column housing. The column housing at least partially surrounds the column tube. The column housing may have one or more projections or other structure to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

During an impact (such as a secondary impact), the structures of the present teaching may be configured to include a suitable combination of elements arranged in a manner so that a column tube, steering shaft, or both, is able to translate forward longitudinally relative to the column housing.

The assembly herein may further employ an energy absorption structure of the type described in Published U.S. Application 2013/0233117, the entirety of which is incorporated by reference herein for all purposes. For instance, the assembly herein may include at least one plastically deformable energy absorption device (e.g., a bend plate, a wire, or some other structure adapted to be carried at least partially by the column housing), wherein the energy absorption device, when employed, absorbs energy by plastic deformation during the secondary impact after the steering shaft support structure (e.g., column tube and steering shaft) starts to translate along the column housing. Any plastically deformable energy absorption device may thus limit the extent of longitudinal travel of the column tube, steering shaft, or both.

The assembly herein includes a tilt adjustment assembly. The assembly may include a tilt bracket having two or more tilt plates extending downwardly on opposing sides of the column tube, column housing, or both. The tilt plates may include one or more generally vertical slots. A tilt bolt or other elongated fastener may extend between the two tilt plates, and the tilt bolt may be received within the vertical slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

To lock the assembly at a desired height or angle relative to the driver, the user operating device, such as a lever, may operate a locking system, such as a cam locking system. A rotational member may be located within either or both of the vertical slots of the opposing tilt plates in the tilt adjustment assembly. The rotational member may be generally oblong or tear shaped, for example. The rotational member may engage (e.g., via teeth) with a wall defining the slot of the tilt plate when the lever or other user operating device is in a locked position. A spring may be keyed to the tilt bolt and attached to the rotational member so that when the lever is in a locked position, the spring pushes or rotates the rotational member so the teeth contact the tilt plate (e.g., at a wall defining the slot). Due to the shape of the rotational member, when the lever is in an unlocked position, the rotational member may disengage from the wall defining the slot of the tilt plate (and the teeth may be clear of the surface), and the rotational member and tilt bolt may be permitted to move freely upwardly or downwardly within the slot to adjust the height and angle of the steering wheel for the driver or user.

The present teachings also contemplate a telescope adjustment assembly. Features of the telescope adjustment assembly may also serve to absorb energy during an impact, such as a secondary impact.

The telescope adjustment assembly may include one or more energy absorption plates. The energy absorption plate may function to secure the position of the column tube, steering shaft, steering wheel, or a combination thereof in a desired fore or aft direction. The energy absorption plate may serve to absorb energy, particularly during the forward telescoping of the column tube when a load exerted on the steering wheel exceeds a threshold load (e.g., during a secondary impact). The energy absorption plate may include two or more generally planar sections that are generally parallel to each other and joined at an arcuate portion (e.g., an arcuate portion pointing generally forward). One of the generally planar sections may be fixedly attached to the column tube (e.g., via one or more fasteners such as screws, rivets, or pins; via one or more adhesives; via one or more methods such as soldering or welding; or a combination thereof).

The other generally planar section may be positioned away from the column tube. This generally planar section may provide an area for engaging a fastener to lock the column tube in place telescopically. As an example, the generally planar section may include a toothed portion (e.g., a slot defined by a plurality of teeth). In another example, the generally planar section may include a series of openings adapted for receiving a fastener, where the opening chosen to receive the fastener impacts the position of the steering shaft telescopically (i.e., a pin in a more forward opening may secure the column tube in a forward direction, whereas a pin toward the rear opening in the generally planar section may secure the column tube closer to the driver or user).

The generally planar section facing away from the column tube may engage with a fastener, such as a spring-biased fastener, such as a pin, which may be actuated by the lever of the steering column assembly. The fastener may be inserted through an opening in the column housing and tilt plate. The fastener may be positioned generally perpendicularly to the column tube. When the fastener, such as a spring-biased fastener, is pushed or when pressure is applied (i.e., the spring is compressed), the tip of the fastener may be caused to engage with the generally planar section. Where the generally planar section includes a slot defined by a plurality of teeth, these teeth may engage with a toothed end of a pin to provide locking engagement to prevent further movement of the column tube in a fore or aft direction. The pressure or compression of the spring-biased fastener may be provided by a portion of the lever or other user operating device. As such, the lever or other user operating device may also allow the user or driver to control the telescoping adjustment of the steering column assembly in a fore and aft direction. The lever may include a ramp portion, or an angled segment facing the column tube and/or column housing. When the lever is in a locked position, the ramp portion may contact the head of the fastener, such as a spring-biased fastener, such as a pin, thereby pushing the pin toward the column tube. When the lever is in an unlocked position, the spring-biased fastener may be released, and as the spring returns to an uncompressed state, the tip or end of the fastener is removed from engagement with the generally planar section (e.g., the toothed portion), and a user is free to pull or push the steering wheel to adjust the position telescopically. In a similar fashion, if the generally planar section facing away from the column tube included a series of holes or openings, the fastener may have a corresponding shape to fit snugly within the hole or opening. The generally planar section may instead include a slot or gap within which a fastener may be received. The fastener may have an oblong cross-section so that in one position the fastener can freely travel within the slot or gap and when rotated may prevent further movement (e.g., similarly to the rotational member and slot described with respect to the tilt adjustment herein).

The generally planar section facing away from the column tube may also include one or more openings for receiving a fastener or other actuator. The generally planar section may include one or more openings for supporting a telescope stop structure that extends away from the column tube. The telescope stop may be secured to the energy absorption plate. The telescope stop, may, for example, include one or more elastic stoppers extending outwardly. The telescope stop may be adapted to guide and/or restrict the travel of the column tube during telescopic adjustment (e.g., to serve as a soft stop when the column tube cannot be pulled back any further) or may serve as a stop for the column tube as it travels forward during a secondary impact.

As mentioned, the energy absorption plate may provide for energy absorption in the event of an impact occasioning a collapse stroke where a portion of the steering column assembly (e.g., the column tube, steering shaft, steering wheel, or a combination thereof) is caused to translate forward, away from the user. As the column tube translates forward, the portion of the energy absorption device attached thereto travels forward with the column tube. This may cause deformation of the energy absorption device. It is contemplated that the generally flat portion of the energy absorption plate facing away from the column tube remains fixed due to its engagement with the spring-biased fastener, such as a pin. The energy absorption plate attached to the column tube will help absorb energy, typically by plastic deformation (e.g., as the first generally flat segment is held in place by the pin and as the second generally flat segment moves with the column tube). As a result of the force of the column tube translating forward, with the energy absorption plate secured thereto, the plate may plastically deform. It may deform with or without plastic elongation, with or without plastic compaction, with or without plastic buckling, or any combination thereof. By pushing a portion of the energy absorption device forward, the curved portion of the energy absorption device may begin to straighten or deform, and another portion that was previously straight may begin to curve or deform. The deformation may be performed in the absence of any anvil or spacer to guide the deformation. The forward end of the column housing may remain fixed in place, or otherwise be limited in the extent of forward travel (e.g., in an amount of about 50 mm or less, about 20 mm or less, or about 10 mm or less).

It is contemplated that energy absorption can be enhanced, or a greater load may be withstood when the steering column assembly includes an actuator, such as a pyrotechnic actuator. It is contemplated that energy absorption can be enhanced with the addition of another energy absorption plate. It is contemplated that energy absorption can be enhanced with the addition of both an actuator and another energy absorption device or plate. For example, another energy absorption plate can be wrapped around the energy absorption plate as described herein. Therefore, the energy absorption plates can be in a nesting configuration. The second energy absorption plate may receive at least a portion of the first energy absorption plate. The first energy absorption plate, the second energy absorption plate, or both, may be secured to the part of the steering column assembly that is adapted to translate forward (e.g., the column tube). The first energy absorption plate and second energy absorption plate may have the same dimensions or different dimensions. The radius at the curve of the energy absorption plates may be different (i.e., with one smaller than the other) to allow one energy absorption plate to be received within or nested within the other. The lengths of one or more generally planar sections may be generally equal between the first and second energy absorption plates. The lengths may be generally different. For example, the first energy absorption plate may have a longer generally planar section facing away from the column tube than that of the second energy absorption plate to permit the first energy absorption plate to engage with the telescoping subassembly (e.g., the fastener, such as a spring-loaded fastener). One or more of the energy absorption plates may have a different shape from another energy absorption plate. For example, a second energy absorption plate may have two or more generally curved or arcuate portions (e.g., forming a serpentine shape, forming an S-shape, or both). A second energy absorption plate having an S-shape may use one free end to bear against a blocking member or a pin of a pyrotechnic actuator, for example, when the blocking member is deployed (e.g., during an impact).

An actuator, such as a pyrotechnic actuator, may include a blocking member, which may be a pin, that engages with one or more energy absorption plates. The blocking member may be deployed upon an impact exceeding a threshold load. The blocking member may be deployed at all times. The blocking member may penetrate one energy absorption plate or both energy absorption plates (i.e., the inner energy absorption plate and the outer energy absorption plate). The blocking member may not penetrate any energy absorption plate. The blocking member may otherwise engage with an energy absorption plate. A free end of an energy absorption plate (e.g., an S-shaped energy absorption plate) may bear against a portion of the blocking member when the blocking member is in a released position (e.g., during an impact), which may increase energy absorption. The blocking member may have one or more features for engaging with one or more features of an energy absorption plate. The end of the blocking member may create a mating engagement with a portion of the surface of an energy absorption plate. The portion of the blocking member may have any shape or texture that is capable of engaging with a portion of the energy absorption plate, with or without penetrating the energy absorption plate. The energy absorption plate may have a complementary shape to accommodate or matingly engage with the blocking member. For example, the blocking member may have one or more teeth adapted to engage with a toothed surface of an energy absorption plate. The blocking member may have a concave or convex shape adapted to engage with a complementary concave or convex shape in the energy absorption plate (e.g., an elevated portion or a dipped portion). The blocking member may have a pointed end or an end with a recess therein to matingly engage with a complementary shape of the energy absorption plate. The blocking member may have a generally circular, rounded, polygonal, square, rectangular, or other cross-sectional shape.

With the blocking member, such as actuator pin, penetrating or engaging one or more energy absorption plates, one or more plates may be adapted to move upon the forward translation of the column tube. If the two energy absorption plates are coupled (e.g., fastened together or penetrated by the actuator blocking member or pin), the plates are adapted to move together upon the forward translation of the column tube, as the actuator acts to fix the energy absorption plates. By the blocking member engaging with a second energy absorption plate (e.g., without penetrating the second energy absorption plate or by only penetrating the second energy absorption plate), and by having the first energy absorption plate nested within the second energy absorption plate, the blocking member may effectively act to couple the plates together without being physically joined to the first energy absorption plate at the blocking member area, thereby still causing both plates to move together upon the forward translation of the column tube.

During an impact exceeding a threshold load, the blocking member may be deployed (if not already), to engage with one or more energy absorption plates, acting to secure the plates. As the column tube moves in a forward direction, with the energy absorption plates secured thereto, both energy absorption plates may begin to deform, where the curved portion of the plates may begin to unwrap, straighten, or otherwise deform. Another portion of the energy absorption plates (e.g., a portion that was previously generally straight and located adjacent the outer surface of the column tube) may begin to curve. The deformation may occur in the absence of any structure guiding the deformation (e.g., an anvil). The deformation of both plates may occur generally simultaneously. Deformation of the plates may occur at different times. For example, the deformation of the second energy absorption plate may occur first to create room for the first energy absorption plate to deform. If the actuator pulls back the pin, or if the blocking member is not deployed (e.g., due to an impact not exceeding a threshold load), the inner plate would function as the energy absorption plate during an impact (e.g., a secondary impact), due to being connected to the column tube as well as being in engagement with the toothed member (i.e., pin of the telescoping subassembly) at the first generally flat portion, while the outer plate moves freely with the column tube (e.g., without deforming).

The energy absorption plates may begin to absorb energy prior to the actuator deploying the blocking member. The energy absorption plates attached to the column tube may begin to translate forward. The actuator may deploy the blocking member once the plates have begun to translate forward (e.g., upon reaching a threshold load). The remaining impact may be taken up through one or both of the energy absorption plates. The blocking member contacting the energy absorption plate may serve to hold at least the second energy absorption plate at or near its end, which may assist in absorbing energy. It is contemplated that either the first or the second energy absorption plate may take up all or a majority of the remaining load.

In general, the teachings herein envision a steering column assembly that employs a column housing with a column tube. The teachings are not limited solely to such assemblies. The teachings also have general application to other types of steering column assemblies. Without limitation, for example, the teachings are also contemplated for use with a steering column assembly that is known typically as a translating column type assembly. Such an assembly may integrate a column housing with a column tube. Such integration may be in the form of a single fabricated unit (e.g., a casting). The unit may be mounted within a vehicle. It may be mounted by way of one or more pins in one or more slots. An energy absorption unit may be employed as well. During a secondary impact, the unit may travel forward along with a tilt lever, or in the absence of a tilt lever.

Put another way, by way of summary (without limitation) of the general teachings herein, in a general respect, the present teachings relate to a collapsing steering column assembly. The assembly includes a steering shaft support structure. For example, it may include a column housing, which may have one or more of the features as described in the present teachings. It may include a column tube which may have one or more of the features as described in the present teachings and being adapted for telescopic adjustment within the column housing. It may simply be a tube or other suitable hollow structure (e.g., the single fabricated unit integrated structure referenced above) for receiving a steering shaft. A steering shaft, which may have one or more of the features as described in the present teachings (which may support a steering wheel that is attached to it in part and may optionally be a part of the assembly), may be supported for rotation (e.g., by one or more bearings), at least in part by the steering shaft support structure and having a longitudinal axis. A bracket, which may have one or more features as described in the present teachings, may be employed for at least partially carrying the steering shaft support structure and attaching the assembly within a vehicle (e.g., to a cross-vehicle structure). For example, as described, the bracket may include a portion that provides a guide structure along one or more downwardly projecting walls for allowing tilt adjustment. At least one securing member, which may have one or more of the features as described in the present teachings (e.g., a tilt bolt, in the case of a tilt adjustable steering column assembly), may be employed for fixing the position of the steering shaft support structure relative to the bracket. For example, the at least one securing member may be operatively connected to an actuator or other user operating device (such as a lever or electromagnetic actuator). The at least one securing member may be operated to apply a force state (e.g., a clamping force or to create an interference fit) to help secure the steering shaft support structure in a fixed position. The assembly may allow at least a portion of the steering shaft support structure to translate forward (e.g., in a collapse stroke) upon the application of a threshold load. The threshold load may be a load of about 0.5 kN or more, or about 2 kN or more. The threshold load may be a load of about 10 kN or less, or about 5 kN or less. The threshold load may be based on a customer's specified load requirements, which is typically between about 2 kN and about 5 kN. There may also be employed one or more energy absorption devices that are operable to absorb energy in response to a force applied to it at least partially due to the forward translation of the steering shaft support structure. For example, a bend plate, a wire, or the like, may be in operative engagement with the at least one securing member and with the steering shaft support structure so that energy is absorbed by way of plastic deformation of the energy absorption device. The steering shaft support structure (e.g., the column tube to which the energy absorption device is attached) may travel forward and may cause the energy absorption device to deform (e.g., plastically) so that energy from the impact is absorbed by virtue of the deformation.

Figure 1:
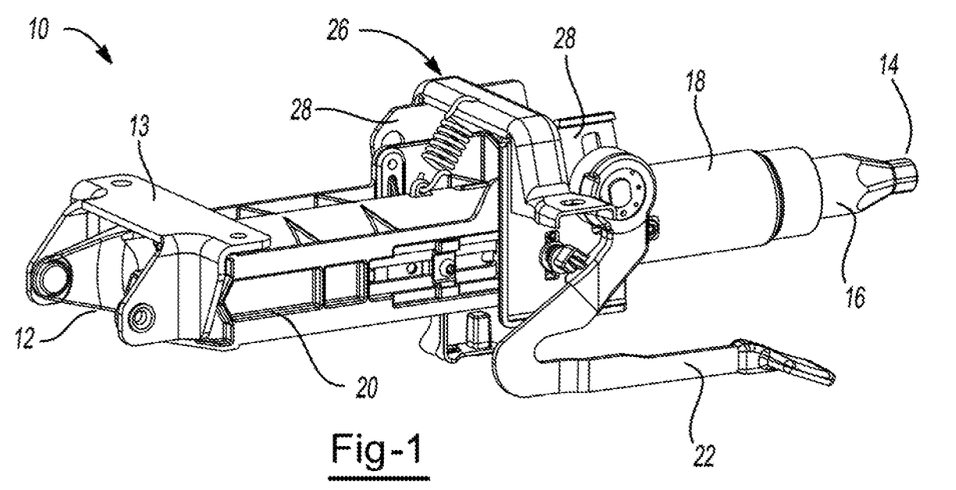
FIG. 1 is a perspective view of an illustrative assembly in accordance with the present teachings.

Turning now to the drawings, FIG. 1 illustrates a steering column assembly 10 having a forward end 12 and a rearward end 14. A column housing 20 is pivotally attached to the vehicle via a mounting bracket 13 located at the forward end 12, though other configurations and brackets for mounting are also contemplated. The steering column assembly 10 includes a steering shaft 16 at the rearward end 14, which is adapted for supporting a steering wheel (not shown). The steering shaft 16 is supported by a column tube 18, which are both supported by the column housing 20. The column tube 18 is movable relative to the column housing 20, particularly in a fore and aft direction for telescoping adjustment. The steering shaft 16 and the column tube 18 are also adapted to be adjusted upwardly or downwardly relative to a driver via a tilt assembly that includes a tilt bracket 26 having two parallel and downwardly depending tilt plates 28 that support and engage a tilt bolt 32 (see FIG. 2A). Adjustment of the steering shaft 16 and column tube 18 in a tilt and/or telescoping manner may be initiated by operating a lever 22, which disengages adjustment mechanisms or unlocks the mechanisms, allowing a driver to put the steering wheel in a desired position.

Figure 2A:
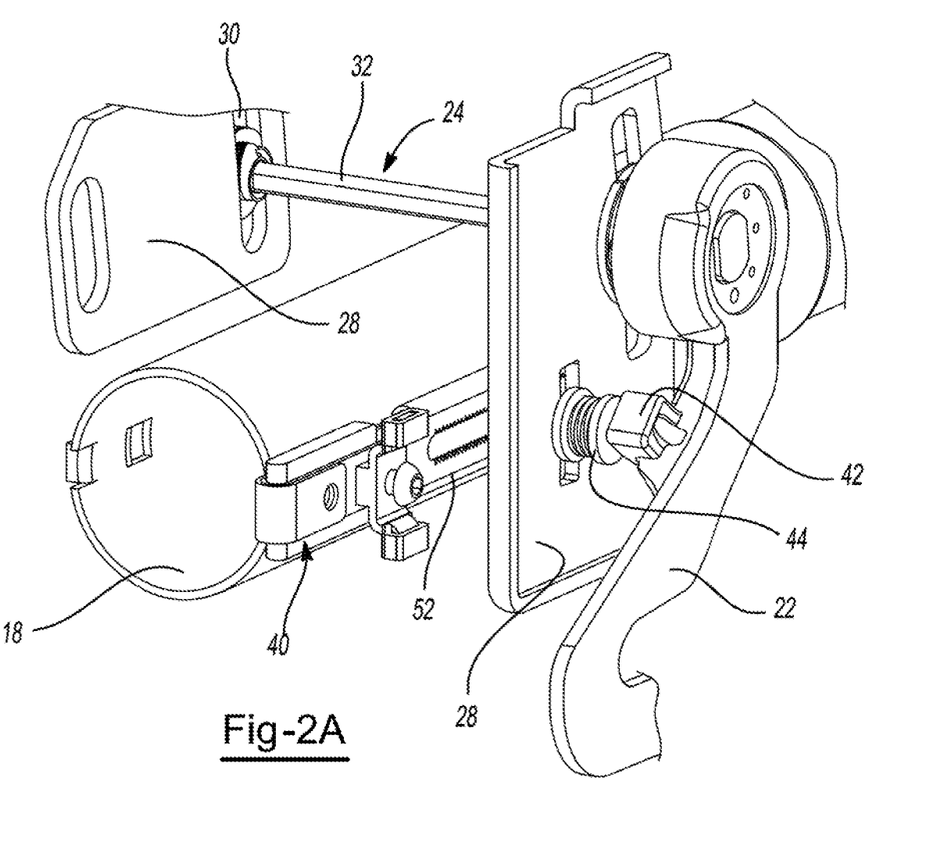

FIG. 2A illustrates the tilt assembly 24 and telescope assembly 40. For illustrative purposes, the column housing is not shown. The position of the column tube 18 is permitted to be adjusted upwardly and downwardly relative to a driver or user of the vehicle via the tilt assembly 24, which includes a tilt bolt 32 supported on both ends by opposing tilt plates 28, each having a slot 30 that is generally vertically oriented (within which a cam or rotational member is located, see FIG. 3). The angle of the column tube 18 can be adjusted manually via unlocking the lever 22 and moving the steering wheel (not shown) to the desired height. The tilt bolt 32 is permitted to move along the slot 30 during tilt adjustment and locks in place upon locking the lever 22.

Figure 2B:
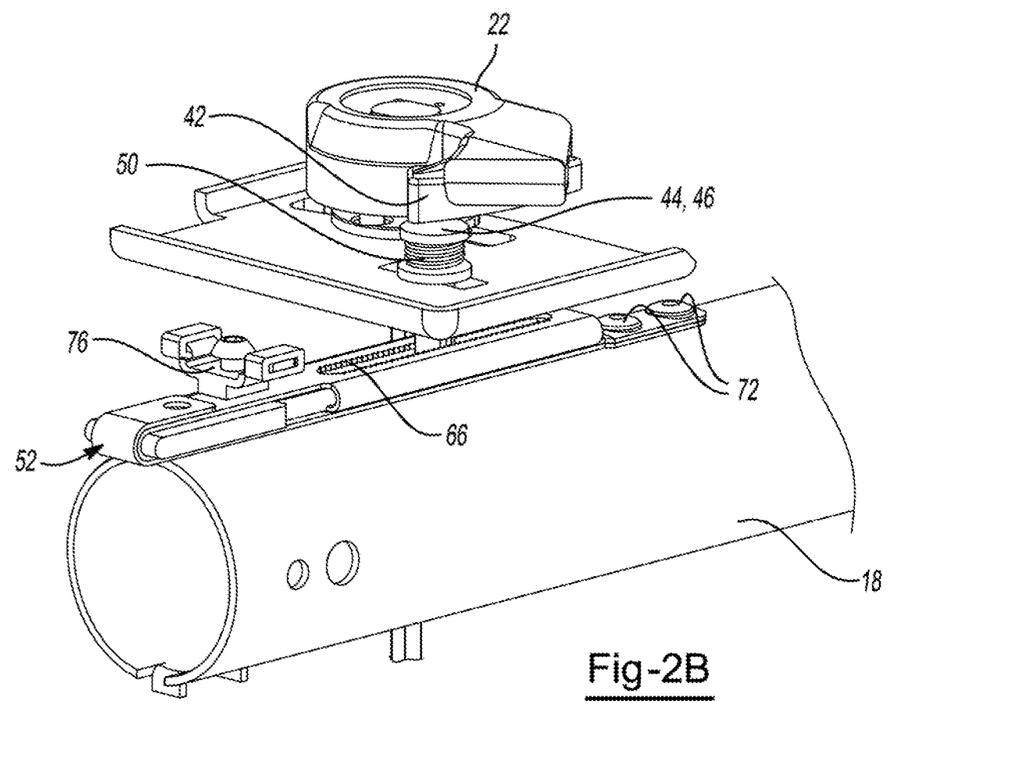

As illustrated in FIGS. 2A and 2B, telescoping adjustment, wherein the column tube is permitted to move fore and aft during adjustment, is accomplished via the telescope assembly 40, which includes an energy absorption plate 52 that engages with a pin 44 when in a locked position. The energy absorption plate 52 includes a portion that contacts and attaches to the outer wall of the column tube 18 (e.g., via rivets 72). During adjustment, a user can unlock the lever 22, which releases the pin 44 from the energy absorption plate 52, allowing the user to adjust the position of the steering wheel (not shown) fore and aft. The lever 22 includes a lever ramp 42 having an angled surface that is adapted to contact the head 46 of the pin 44. When the lever 22 is in an unlocked position, the lever ramp 42 puts less or no pressure on the head 46 of the pin 44. A spring 50 located around the body of the pin 44 between the head 46 and the tilt plate decompresses, thereby pushing the pin away from the energy absorption plate 52. When the lever 22 is in a locked position, the lever ramp 42 increases pressure on the head 46 of the pin 44, which compresses the spring 50. The toothed end 48 of the pin 44 (see FIG. 5) is forced toward the energy absorption plate 52 and engages with the toothed portion 66 of the energy absorption plate 52, thereby securing the telescoping position of the column tube 18 within the assembly.

FIG. 2B also illustrates an exemplary telescope stop 76. The telescope stop 76 is secured to the energy absorption plate 52 and includes one or more elastic stoppers extending outwardly. The telescope stop 76 may be adapted to guide and/or restrict the travel of the column tube during telescopic adjustment (e.g., to serve as a soft stop when the column tube cannot be pulled back any further) or may serve as a stop for the column tube as it travels forward during a secondary impact.

Figure 3:
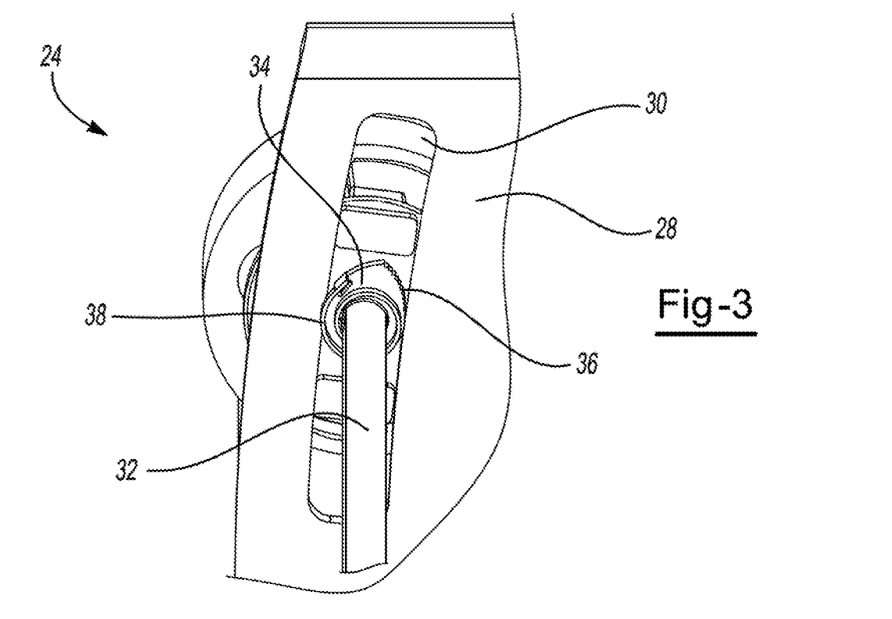
FIG. 3 illustrates a portion of the tilt assembly in accordance with the present teachings.

FIG. 3 illustrates a portion of the tilt assembly 24. When the lever 22 (see FIGS. 2A and 2B) is in an unlocked position, the tilt bolt 32 is permitted to move upwardly and/or downwardly within the slot 30 of the tilt plate 28. The tilt assembly 24 includes a rotational member 34 on one or both sides of the tilt bolt 32. The rotational member 34 has an oblong shape with teeth 36 located on at least a portion of the rotational member. Due to the shape of the rotational member, in an unlocked position, the rotational member is permitted to move within the slot 30. When the tilt assembly 24 is in a locked position, a spring 38 is keyed to the tilt bolt 32, and the spring 38 pushes the rotational member 34 toward a wall defining the slot 30. The teeth 36 of the rotational member 34 contact the wall defining the slot, creating an interference fit and locking the tilt assembly in place. As mentioned, this rotational member arrangement may be present on both sides of the steering column assembly (i.e., where a rotational member 34 and spring 38 are located within the slots 30 of the tilt plates 28 on opposing sides of the steering column assembly).

Figure 4:
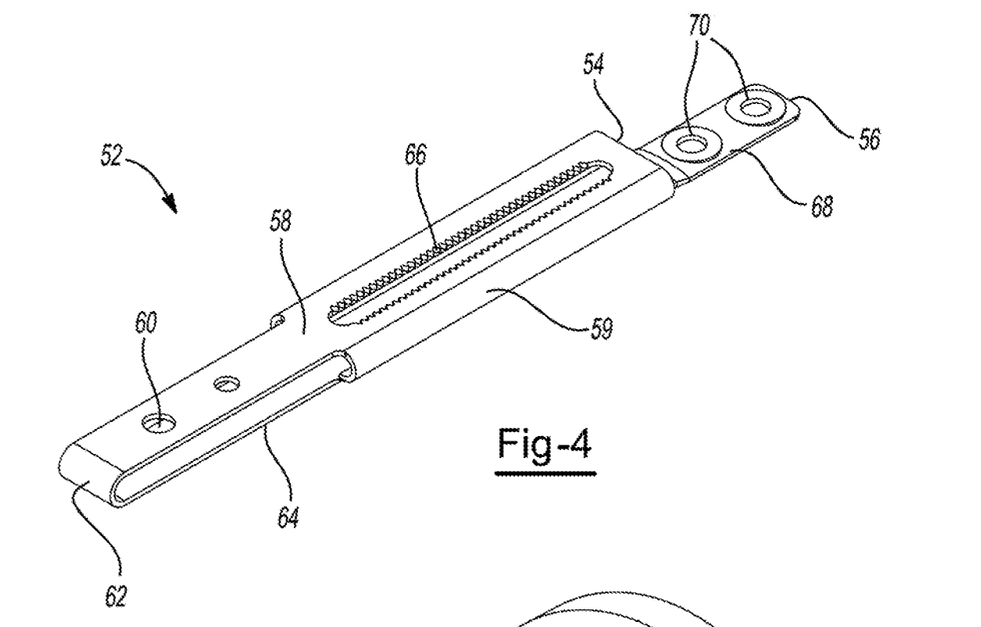
FIG. 4 illustrates an exemplary energy absorption plate in accordance with the present teachings.
Figure 5:
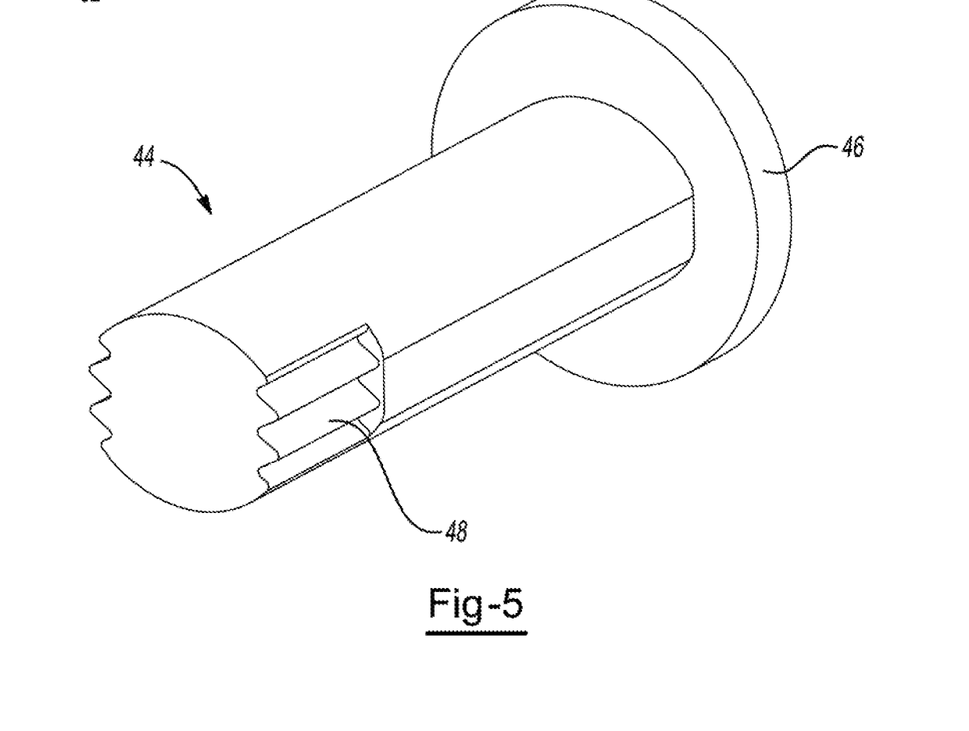
FIG. 5 illustrates an exemplary pin in accordance with the present teachings.

FIG. 4 illustrates an exemplary energy absorption plate 52 having a first end 54 and a second end 56. The energy absorption plate 52 has parallel portions, a first generally flat segment 58 and a second generally flat segment 64. The first generally flat segment 58 extends from the first end 54 to an arcuate portion 62. Over a portion of the first generally flat segment, there is a curved side wall 59 (and a corresponding curved side wall on the opposing side), which may serve to guide deformation of the energy absorption plate 52, may act as a spring between the first generally flat segment 58 and the second generally flat segment 64, or may act as a spacer between the first generally flat segment 58 and the second generally flat segment 64. The first generally flat segment 58 includes a toothed portion 66, which is adapted to engage with the toothed portion 48 of the pin 44 (as shown in FIG. 5). The first generally flat segment 58 further includes one or more openings 60 for receiving pins, fasteners, or for supporting the telescope stop 76 (see FIG. 2B). On the opposing side of the arcuate portion 62 is the second generally flat segment 64, which is adapted to bear against and attach to the outer diameter of the column tube 18 (see FIGS. 2A and 2B). The second generally flat segment 64 includes a connection segment 68, where the energy absorption plate 52 is fixed to the column tube 18 (see FIGS. 2A and 2B). The connection segment 68 includes attachment openings 70 for receiving a fastener, such as the rivets shown in FIGS. 6A and 6B. The energy absorption plate 52 is adapted to assist in telescope adjustment of the steering column assembly (e.g., of the steering wheel in a fore and aft direction), as well as provide energy absorption during the forward translation of the column tube during a secondary impact when the load exerted on the steering wheel exceeds the threshold load.

FIG. 5 illustrates an exemplary pin 44 that is adapted to be used to lock the steering column assembly in its desired telescoped position. The pin 44 includes a head 46 that is adapted to contact the lever ramp 42 during locking and unlocking of the lever 22 (see FIGS. 2A and 2B). The pin 44 also includes a toothed end 48, where the teeth engage with the toothed portion 66 of the energy absorption plate 52 when the lever 22 is in the locked position (see FIGS. 2A and 2B).

Figure 6A:
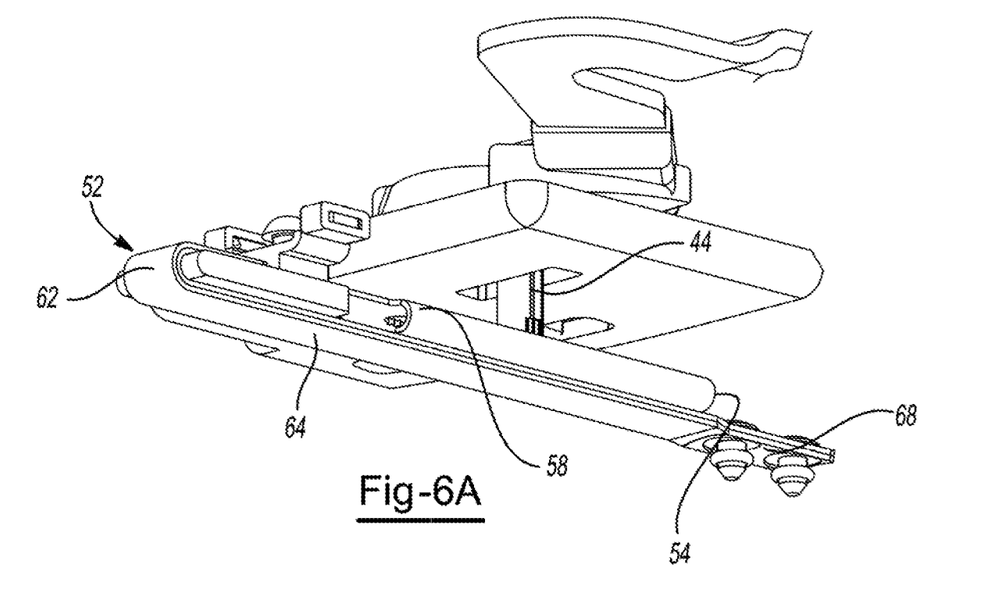
FIG. 6A illustrates the energy absorption plate within a steering column assembly prior to a secondary impact.
Figure 6B:
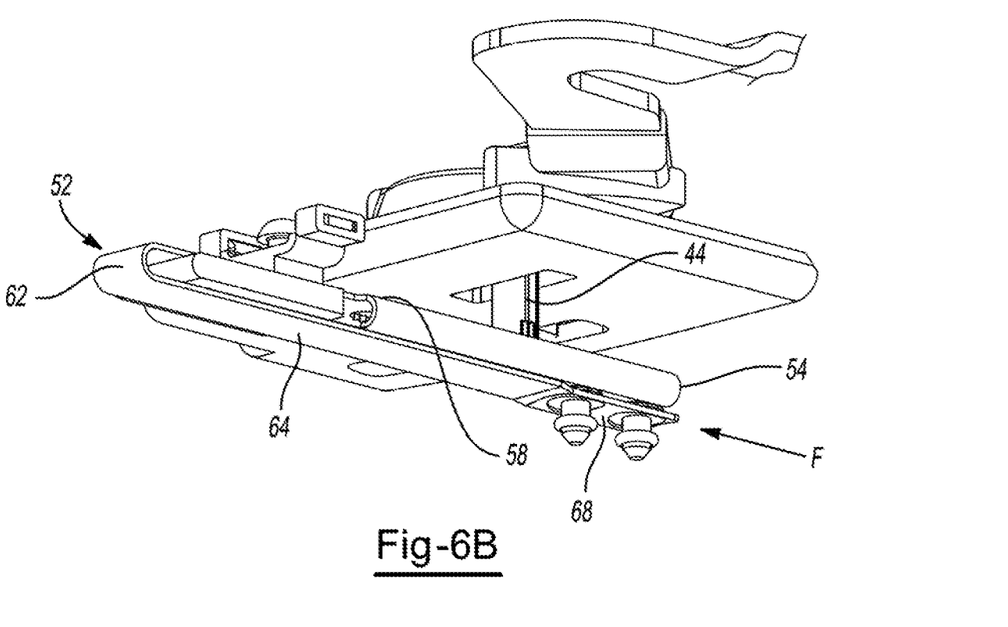
FIG. 6B illustrates deformation of the energy absorption plate during or after a secondary impact in accordance with the present teachings.

FIGS. 6A and 6B illustrate possible deformation of the energy absorption plate 52. For clarity in illustrating the deformation, the column tube has been omitted. FIG. 6A illustrates the energy absorption plate 52 prior to deformation, where the connection segment 68 extends beyond the first end 54. As shown, the pin 44 is locked in the toothed portion of the first generally flat segment 58. In FIG. 6B, upon the application of a force in a forward direction indicated by the arrow labeled F, the energy absorption plate 52 is pulled forward, due to the forward translation of the column tube to which it is attached. The connection segment 68 has been pulled forward, as is shown by the presence of the connection plate being moved to below the first end 54 of the energy absorption plate 52. The position of the arcuate portion 62 has moved forward due to the deformation of the second generally flat segment 64. Because the assembly is in the locked position, with the pin 44 received within and engaged by the toothed portion of the energy absorption plate 52, the first generally flat segment 58 remains in place and exhibits minimal deformation, if any. The second generally flat segment 64, due to being fixedly attached to the column tube via rivets, is pulled with the column tube during its forward translation, and deforms to absorb energy.

Figure 7:
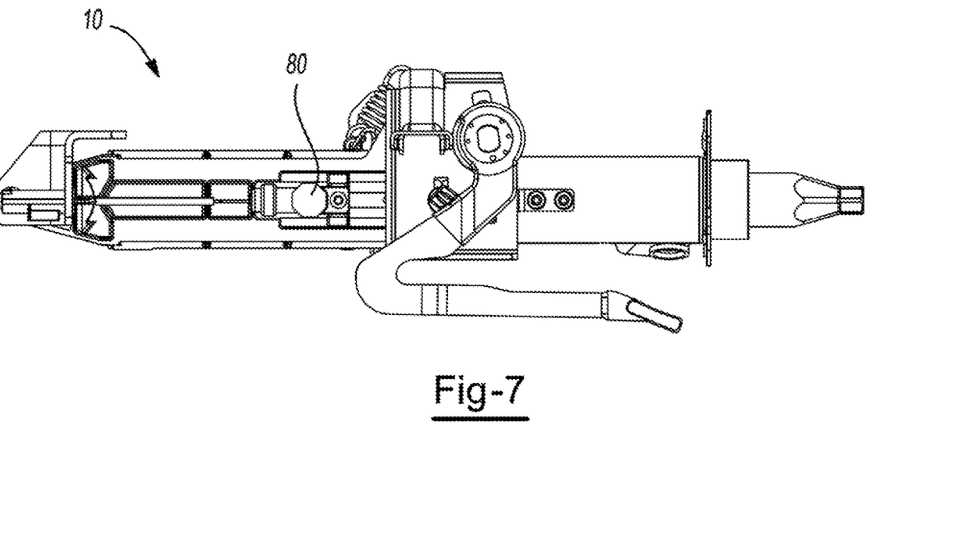
FIG. 7 is a side view of an illustrative assembly in accordance with the present teachings.

FIG. 7 illustrates a steering column assembly 10 including features as discussed previously. The figure also illustrates an actuator 80, which may be a pyrotechnic actuator, which provides for the ability to selectively change between two different energy absorption loads.

Figure 8A:
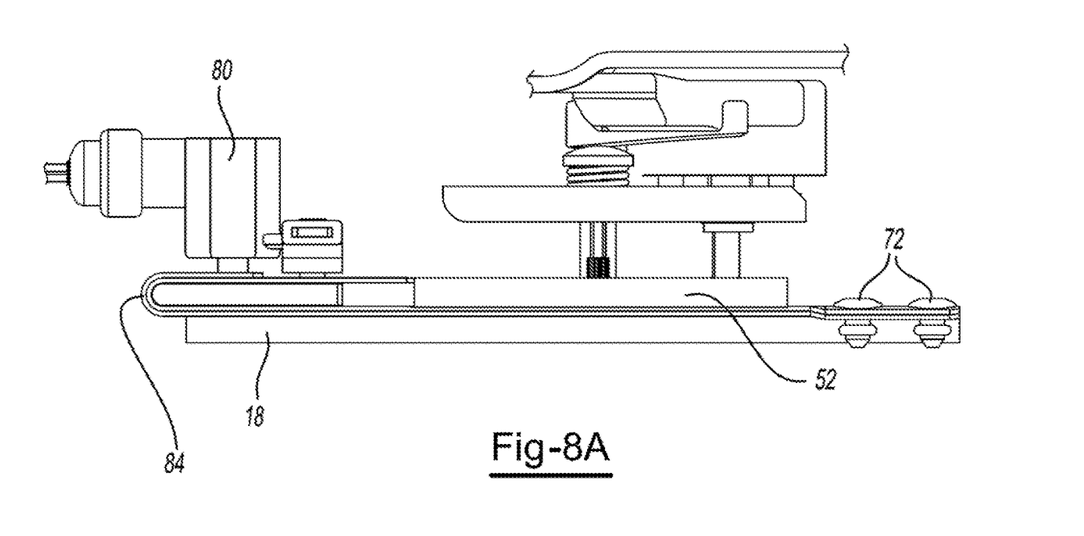
FIG. 8A illustrates a side view of a pyrotechnic actuator in accordance with the present teachings.

FIG. 8A illustrates a side view of an assembly including an energy absorption plate 52 nested within a second energy absorption plate 84. Both energy absorption plates 52, 84 are fixed to the column tube 18 via rivets 72. The actuator 80 is shown penetrating both energy absorption plates 52, 84.

Figure 8B:
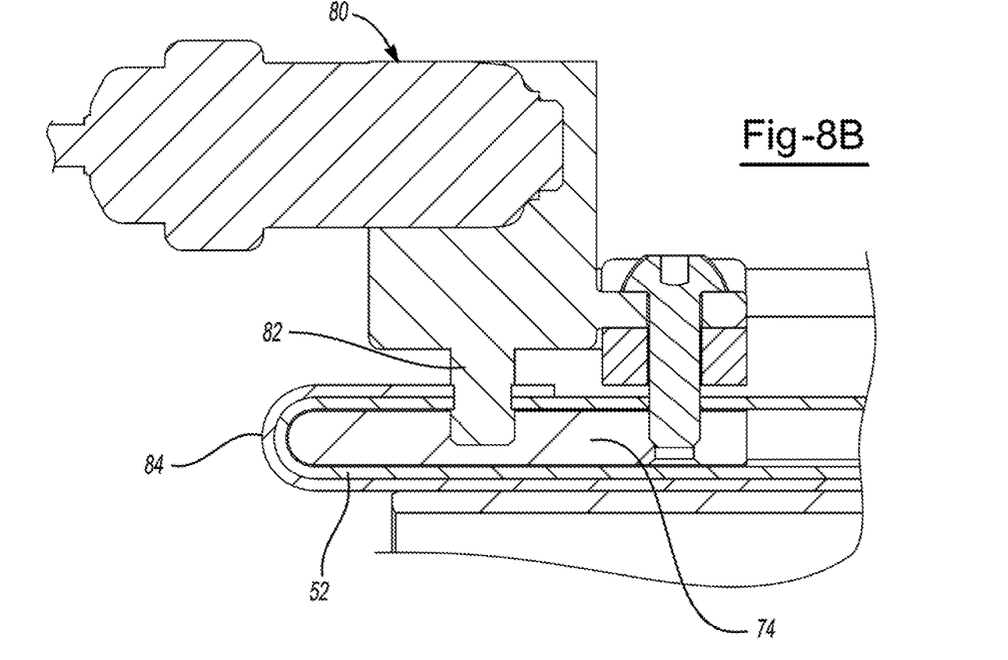

FIG. 8B illustrates an enlarged, partial cutaway version of FIG. 8A. As shown, the actuator 80 includes a blocking member, shown as an actuator pin 82. With the actuator pin 82 extended, the pin penetrates through both the energy absorption plate 52 and the second energy absorption plate 84 via openings therein. The actuator pin extends partially through a spacer 74 in the figure; however, a spacer is not required, and an assembly free of a spacer is within the scope of the present teachings. With the actuator pin 82 extending through both energy absorption plates, joining them together, a higher load can be endured, and energy is absorbed through both energy absorption plates 52, 84. The actuator pin 82 may be optionally contracted for lower load conditions, i.e., so the actuator pin no longer penetrates either or both of the energy absorption plates, in which case, the energy absorption would be performed by the inner energy absorption plate 52 as described in FIGS. 6A and 6B.

Figure 9:
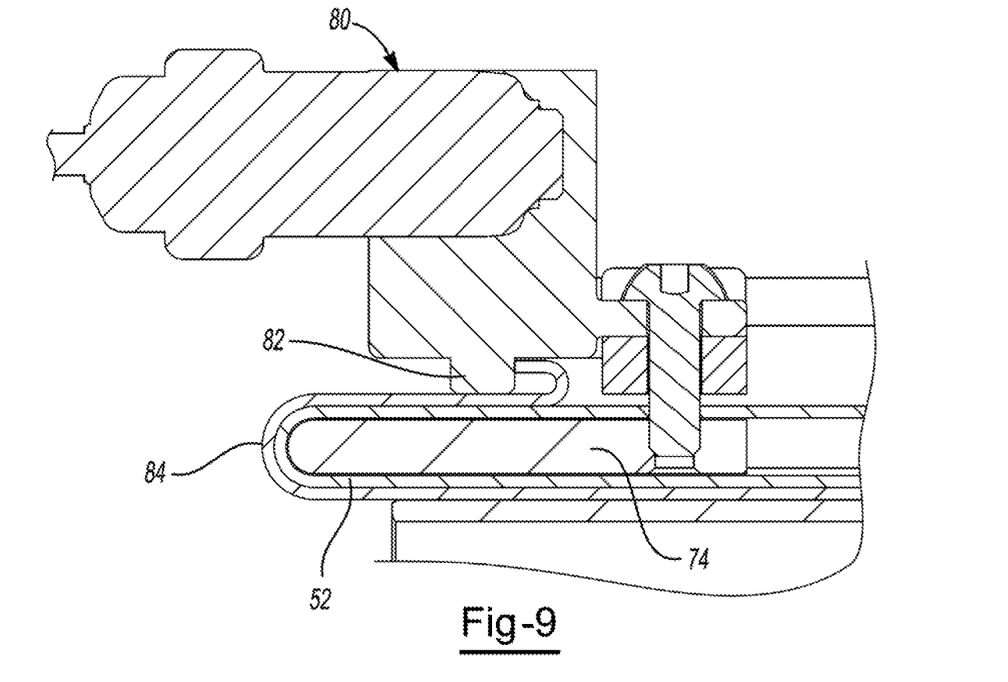
FIG. 9 illustrates a partial cutaway view of a pyrotechnic actuator engaging with an energy absorption plate in accordance with the present teachings.

FIG. 9 illustrates an enlarged, partial cutaway of an assembly including an actuator 80 having a blocking member, shown as actuator pin 82. As illustrated, the actuator pin 82 does not penetrate either a first energy absorption plate 52 or a second energy absorption plate 84 or the spacer 74. Again, the present teachings also contemplate assemblies free of a spacer 74. For providing energy absorption during an impact, the actuator pin 82 may be deployed to engage with the outer surface of the second energy absorption plate 84. The second energy absorption plate 84 may include, as shown, a second curved portion (e.g., forming a backwards S-shape) terminating at a free end, where the free end bears against a side surface of the actuator pin 82 for providing energy absorption during an impact.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to make the steering wheel adjustment subassembly from multiple subassemblies. The energy absorption mechanism described may be substituted with some other mechanism. Rather than a toothed end of a pin engaging with a toothed portion of an energy absorption device, it is contemplated that a pin (which may be free of teeth) may be inserted into one of a series of openings along the length of the first generally flat portion. It is also contemplated that toothed slots may be located elsewhere within the assembly. For example, instead of, or in addition to a cam or rotational member located within a slot of the tilt plate, the slot may be defined by a toothed opening that engages with a spring or a toothed cam or rotational member. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where translation of the column tube may be desirable for substantially reducing load that otherwise would be transferred to a vehicle operator.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of al articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. An energy absorption plate for a steering column assembly comprising:
   a. a first end and a second end;
   b. an arcuate segment;
   c. a first generally flat segment between the first end and the arcuate segment;
   d. a second generally flat segment between the second end and the arcuate segment;
      wherein the first generally flat segment is situated generally parallel to the second generally flat segment and faces away from a column tube and toward a downwardly oriented tilt plate of the steering column assembly;
      wherein the second generally flat segment is adapted to be secured to the column tube of the steering column assembly;
      wherein the first generally flat segment includes one or more features for engaging with a fastener to lock the column tube in position in the steering column assembly.

2. The energy absorption plate of claim 1, wherein the first generally flat segment comprises a toothed portion for engaging with a toothed fastener that extends through the downwardly oriented tilt plate and generally parallel to a tilt bolt.

3. The energy absorption plate of claim 1, wherein the second generally flat segment is employed for absorbing energy by way of plastic deformation of the energy absorption plate during a forward translation of the column tube during a secondary impact.

4. A collapsing steering column assembly comprising:
   a. a column tube;
   b. a steering shaft that is supported for rotation at least in part by the column tube;
   c. a bracket for at least partially carrying the column tube;
   d. a downwardly oriented tilt plate flanking the column tube;
   e. the energy absorption plate of claim 1, wherein the energy absorption plate is secured to the column tube and the first generally flat segment faces the downwardly oriented tilt plate;
   f. a manually operated steering wheel adjustment subassembly including a lever for manually actuating the steering wheel adjustment subassembly.

5. The collapsing steering column assembly of claim 4, wherein the column tube is configured for telescoping insertion within a column housing.

6. The collapsing steering column assembly of claim 4, wherein the steering wheel adjustment subassembly is adapted for:
   a. selectively adjusting the steering shaft, column tube, or both, in a fore or aft direction generally along a longitudinal axis;
   b. selectively raising or lowering the steering shaft, column tube, or both; or
   c. both a. and b.

7. The collapsing steering column assembly of claim 6, wherein the steering wheel adjustment subassembly includes a spring-biased pin adapted to engage with or be received within the one or more features of the first generally flat segment of the energy absorption plate to lock the column tube in position in the steering column assembly.

8. The collapsing steering column assembly of claim 7, wherein the spring-biased pin includes a toothed end portion that engages with a toothed portion of the first generally flat segment.

9. The collapsing steering column assembly of claim 4, wherein the lever includes a ramp having an angled surface adapted to directly contact a spring-biased fastener to cause engagement of the fastener and the first generally flat segment of the energy absorption plate when in a locked position.

10. The collapsing steering column assembly of claim 4, wherein the second generally flat segment is adapted to absorb energy by way of plastic deformation of the energy absorption plate during a forward translation of the column tube during a secondary impact.

11. The collapsing steering column assembly of claim 4, wherein the assembly further comprises a securing member for fixing a secure engagement position of the column tube relative to the bracket.

12. The collapsing steering column assembly of claim 4, wherein the bracket includes a pair of generally opposing downwardly oriented tilt plates that flank either or both of at least a portion of the column tube or a column housing.

13. The collapsing steering column assembly of claim 12, wherein the tilt plates each have a vertical slot, each vertical slot receiving a toothed rotational member that engages with a wall defining the vertical slot for securing the column tube at a desired angle.

14. The collapsing steering column assembly of claim 4, wherein the energy absorption plate, when employed, absorbs energy by plastic deformation during an impact as the column tube translates along a column housing.

15. The collapsing steering column assembly of claim 4, further comprising a second energy absorption plate wrapped around the energy absorption plate, wherein both energy absorption plates are fixed to the column tube.

16. The collapsing steering column assembly of claim 15, wherein the assembly further comprises an actuator having a blocking member that engages with one or both energy absorption plates to increase energy absorption.

17. The collapsing steering column assembly of claim 16, wherein the blocking member is an actuator pin that penetrates one or both energy absorption plates to increase energy absorption.

18. The collapsing steering column assembly of claim 16, wherein the blocking member engages with a portion of the second energy absorption plate without penetrating the second energy absorption plate.

19. The collapsing steering column assembly of claim 16, wherein the actuator is a pyrotechnic actuator employed to selectively change between two different energy absorption loads.

20. The collapsing steering column assembly of claim 4, wherein the assembly is free of a spacer that guides deformation of the energy absorption plate.

\* \* \* \* \*